United States Patent
Wang et al.

(10) Patent No.: US 9,843,275 B2
(45) Date of Patent: Dec. 12, 2017

(54) CYLINDRICAL AND SPHERICAL TRIBOELECTRIC GENERATORS

(71) Applicants: Zhong Lin Wang, Atlanta, GA (US); Guang Zhu, Atlanta, GA (US); Ya Yang, Atlanta, GA (US); Hulin Zhang, Atlanta, GA (US); Youfan Hu, Atlanta, GA (US); Jin Yang, Atlanta, GA (US); Qingshen Jing, Atlanta, GA (US); Peng Bai, Atlanta, GA (US)

(72) Inventors: Zhong Lin Wang, Atlanta, GA (US); Guang Zhu, Atlanta, GA (US); Ya Yang, Atlanta, GA (US); Hulin Zhang, Atlanta, GA (US); Youfan Hu, Atlanta, GA (US); Jin Yang, Atlanta, GA (US); Qingshen Jing, Atlanta, GA (US); Peng Bai, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/338,846

(22) Filed: Oct. 31, 2016

(65) Prior Publication Data
US 2017/0077838 A1    Mar. 16, 2017

Related U.S. Application Data

(60) Division of application No. 14/307,656, filed on Jun. 18, 2014, now Pat. No. 9,571,009, and a
(Continued)

(51) Int. Cl.
*H02N 1/04*    (2006.01)
(52) U.S. Cl.
CPC .................... *H02N 1/04* (2013.01)

(58) Field of Classification Search
CPC ............................................ H02N 1/00–1/012
(Continued)

(56) References Cited

U.S. PATENT DOCUMENTS 4,754,185 A * 6/1988 Gabriel ................. H02N 1/004
                                                            310/309
4,990,813 A * 2/1991 Paramo .................... H02N 1/04
                                                            310/308

(Continued)

OTHER PUBLICATIONS

F.-R.Fan, et al., Flexible triboelectric generator, NanoEnergy, Jan. 20, 2012.*

*Primary Examiner* — Thomas Truong
(74) *Attorney, Agent, or Firm* — Bryan W. Bockhop; Bockhop Intellectual Property Law, LLC

(57) ABSTRACT

A generator includes a first member, a second member and a sliding mechanism. The first member includes a first electrode and a first dielectric layer affixed to the first electrode. The first dielectric layer includes a first material that has a first rating on a triboelectric series. The second member includes a second material that has a second rating on the triboelectric series that is different from the first rating. The second member includes a second electrode. The second member is disposed adjacent to the first dielectric layer so that the first dielectric layer is disposed between the first electrode and the second electrode. The sliding mechanism is configured to cause relative movement between the first member and the second member, thereby generating an electric potential imbalance between the first electrode and the second electrode.

6 Claims, 9 Drawing Sheets

Related U.S. Application Data continuation-in-part of application No. 14/189,656, filed on Feb. 25, 2014.

(60) Provisional application No. 61/836,454, filed on Jun. 18, 2013, provisional application No. 61/771,371, filed on Mar. 1, 2013.

(58) Field of Classification Search
USPC ......... 310/300, 309, 310; 200/181; 322/2 A; 318/116
See application file for complete search history.

(56) References Cited

U.S. PATENT DOCUMENTS

| | | | |
|---|---|---|---|
| 2011/0050181 A1* | 3/2011 | Post | H02N 1/04 320/166 |
| 2012/0228964 A1* | 9/2012 | Uesugi | H02N 1/08 307/400 |

\* cited by examiner

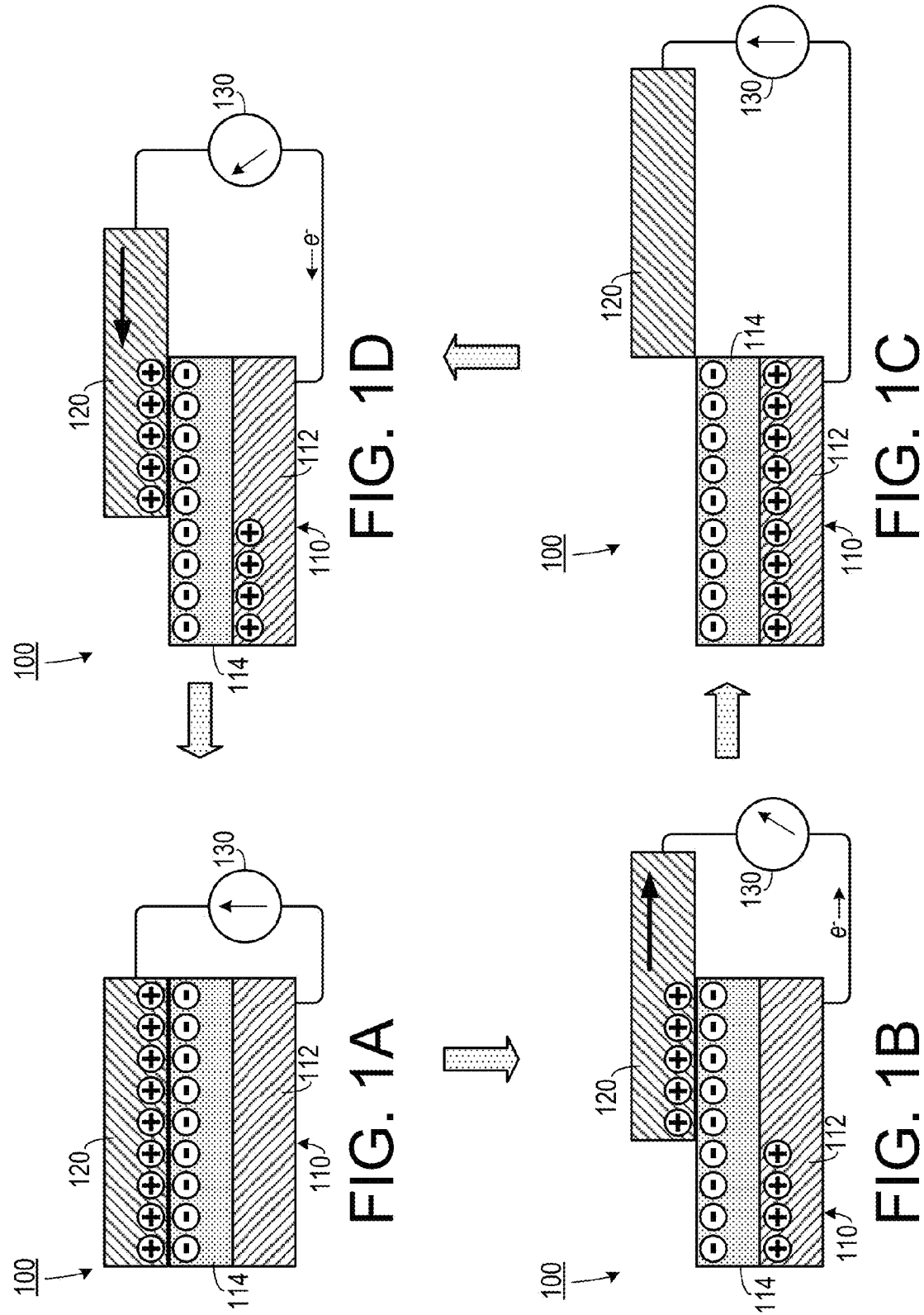

CYLINDRICAL AND SPHERICAL TRIBOELECTRIC GENERATORS

CROSS-REFERENCE TO RELATED APPLICATION(S)

This application is divisional of, and claims the benefit of, U.S. patent application Ser. No. 14/307,656, filed Jun. 18, 2014, which claims the benefit of U.S. Provisional Patent Application Ser. No. 61/836,454, filed Jun. 18, 2013, and which is a continuation-in-part of, and claims the benefit of, U.S. patent application Ser. No. 14/189,656, filed Feb. 25, 2014, which claims the benefit of U.S. Provisional Patent Application Ser. No. 61/771,371, filed Mar. 1, 2013 the entirety of each of which is hereby incorporated herein by reference.

STATEMENT OF GOVERNMENT INTEREST

This invention was made with government support under agreement No. DE-FG02-07ER46394, awarded by the Department of Energy, and under agreement No. CMMI-0946418, awarded by the National Science Foundation. The government has certain rights in the invention.

BACKGROUND OF THE INVENTION

1. Field of the Invention

The present invention relates to generators and, more specifically, to a system for generating voltage and current using the triboelectric effect.

2. Description of the Related Art

Energy harvesting by converting ambient energy into electricity may offset the reliance of small portable electronics on traditional power supplies, such as batteries. When long-term operation of a large number of electronic devices in dispersed locations is required, energy harvesting has the advantages of outstanding longevity, relatively little maintenance, minimal disposal and contamination.

When two materials, at least one of which is non-conducting, come into contact with each other, a chemical bond, known as adhesion, is formed between the two materials. Depending on the triboelectric properties of the materials, one material may "capture" some of the electrons from the other material. If the two materials are separated from each other, a charge imbalance will occur. The material that captured the electron will negatively charged and the material that lost an electron will be positively charged. This charge imbalance gives rise to what is sometimes referred to as "static electricity." The term "static" in this case is somewhat deceptive, as it implies a lack of motion when in reality motion is necessary for charge imbalances to flow. The spark one feels upon touching a door knob is an example of such flow.

The triboelectric effect is a type of contact electrification in which certain materials become electrically charged after they come into contact with another such as through friction. It is the mechanism though which static electricity is generated. The triboelectric effects associated electrostatic phenomena are the most common electrical phenomena in daily life, from walking to driving. However, the triboelectric effect has been largely ignored as an energy source for electricity. Some electrostatic micro-generators have been developed and used in research relating to micro-electromechanical systems (MEMS), but such designs rely on an extra voltage source to charge electrode plates instead of harnessing triboelectric effect, leading to complicated structures and fabrication processes.

Previously demonstrated triboelectric generators require periodic contact and vertical separation of two materials that have opposite triboelectric polarities, making it only applicable to harvest energy from intermittent impact or shock. Such systems typically include a cavity with a constantly changing volume, which makes packaging difficult and limits applications in atmospheres with high humidity, corrosive chemicals or gases, and in water or other liquids.

Therefore, there is a need for a reliable, small and easily manufactured system for harvesting triboelectric energy.

SUMMARY OF THE INVENTION

The disadvantages of the prior art are overcome by the present invention which, in one aspect, is a generator that includes a first member, a second member and a sliding mechanism. The first member includes a first electrode and a first dielectric layer affixed to the first electrode. The first dielectric layer includes a first material that has a first rating on a triboelectric series. The second member includes a second material that has a second rating on the triboelectric series that is different from the first rating. The second member includes a second electrode. The second member is disposed adjacent to the first dielectric layer so that the first dielectric layer is disposed between the first electrode and the second electrode. The sliding mechanism is configured to move the first member laterally against the second member in a first direction, thereby generating an electric potential imbalance between the first electrode and the second electrode.

In another aspect, the invention is a method of generating electricity, in which a first member is placed against a second member. The first member includes: a first electrode and a first dielectric layer affixed to the first electrode the first dielectric layer including a first material that has a first rating on a triboelectric series. The second member includes a second material that has a second rating on the triboelectric series that is different from the first rating. The second member also includes a second electrode. The second member is disposed adjacent to the first dielectric layer so that the first dielectric layer is disposed between the first electrode and the second electrode. The first member is slid laterally against the second member along a first direction so that when at least a portion of the first member has slid apart from at least a portion of the second member, an electric potential imbalance occurs between the first electrode and the second electrode.

In another aspect, the invention is a generator that includes a substantially cylindrical first member, which includes: a first electrode; and a first dielectric layer affixed to the first electrode, the first dielectric layer including a first material that has a first rating on a triboelectric series, the first dielectric layer including a first grating of evenly spaced apart parallel ridges and troughs disposed along a second direction that is transverse to the first direction. A substantially cylindrical second member is disposed inside of the first member. The second member includes a second material that has a second rating on the triboelectric series that is different from the first rating. The second member includes a second electrode. The second member is disposed adjacent to the first dielectric layer so that the first dielectric layer is disposed between the first electrode and the second electrode. The second member includes a second grating of evenly spaced apart parallel ridges and troughs disposed along the second direction. A sliding mechanism configured to cause relative motion between the first member against the second member, thereby generating an electric potential imbalance between the first electrode and the second electrode.

In another aspect, the invention is a generator that includes a cylinder having a top end and an opposite bottom end. A top cap member caps the top end of the cylinder and includes a first electrode layer and a first triboelectric material layer disposed under the first electrode layer. The first triboelectric material layer has a first rating on a triboelectric series. A bottom cap member caps the bottom end of the cylinder and includes a second electrode layer and a second triboelectric material layer disposed above the second electrode layer. The second triboelectric material layer has a second rating on the triboelectric series. A piston is slidably disposed within the cylinder. The piston includes: a cylindrical body portion having a top surface and an opposite bottom surface; a third electrode layer disposed on the top surface; a third triboelectric material layer disposed on the third electrode layer, the third triboelectric material layer having a third rating on the triboelectric series that is different from the first rating on the triboelectric series; a fourth electrode layer disposed on the bottom surface; and a fourth triboelectric material layer disposed below the fourth electrode layer, the fourth triboelectric material layer having a fourth rating on the triboelectric series that is different from the second rating on the triboelectric series.

In another aspect, the invention is a generator that includes a first reference surface. A second reference surface is spaced apart at a fixed distance from the first reference surface. A spring has a first end and an opposite second end. The first end is affixed to the reference surface and the spring depends downwardly therefrom. An inertial member is affixed to the second end of the spring and has a bottom surface. A first triboelectric member is affixed to the bottom surface of the inertial member and includes a material that has a first rating on a triboelectric series and a conductive layer. A second triboelectric member is disposed below the first triboelectric member and is affixed to the second reference surface. The second triboelectric member includes a material that has a second rating on the triboelectric series. The second rating is different from the first rating. The second triboelectric member also includes a conductive layer. A dielectric layer is disposed on a selected one of the first triboelectric member and the second triboelectric member. The dielectric layer is configured to electrically isolate the conductive layer of the first triboelectric member from the conductive layer of the second triboelectric member.

In yet another aspect, the invention is a generator that includes a waterproof shell having an inside surface. A conductive inner surface is affixed to the inside surface of the shell. A first triboelectric layer is affixed to the conductive inner surface and includes a first material that has a first rating on a triboelectric series. A conductive three dimensional object has dimensions configured to fit inside of the shell. A second triboelectric layer is affixed to the three dimensional object and includes a second material that has a second rating on the triboelectric series, in which the second rating different from the first rating. A first conductor is electrically coupled to the conductive inner surface and extends to outside of the shell. A second conductor is electrically coupled to the three dimensional object and extends to outside of the shell. A member is configured to suspend the three dimensional object within the shell and to allow the three dimensional object to move freely from a plurality of positions in which the second triboelectric layer is in contact with the first triboelectric layer to a plurality of positions in which the second triboelectric layer is not in contact with the first triboelectric layer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-1D are a series of schematic diagrams one embodiment of a triboelectric generator.

DETAILED DESCRIPTION OF THE INVENTION

Figure 2A:
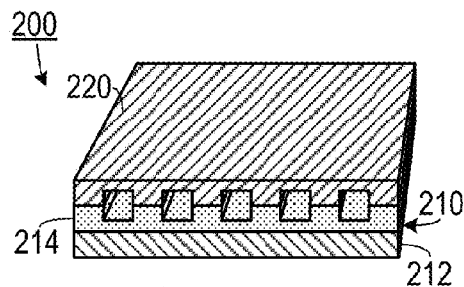
FIG. 2A is a perspective view of an embodiment of a grooved triboelectric generator.
Figure 2B:
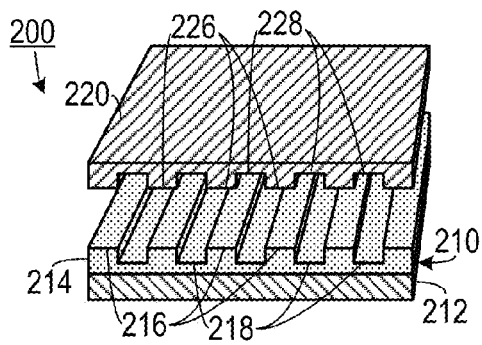
FIG. 2B is a perspective view of an embodiment of a grooved triboelectric generator in which the first member is separated from the second member.
Figure 3A:
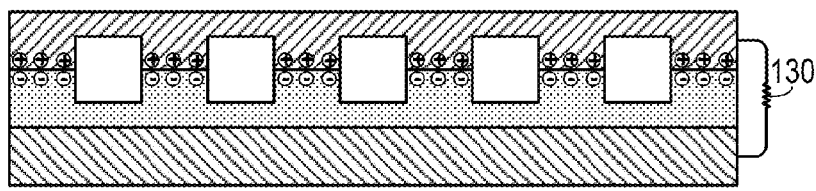
FIGS. 3A-3D are a series of schematic diagrams showing electric generation using the embodiment shown in FIG. 2A.
Figure 3B:
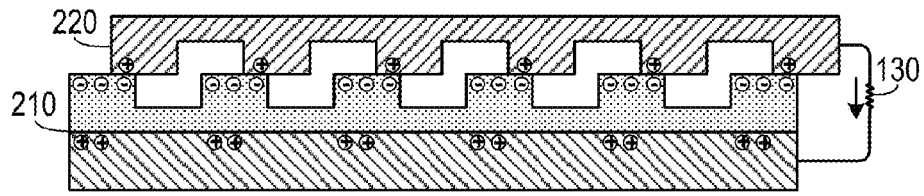
Figure 3C:
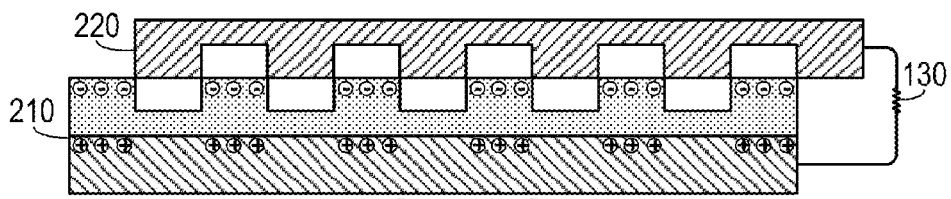
Figure 3D:
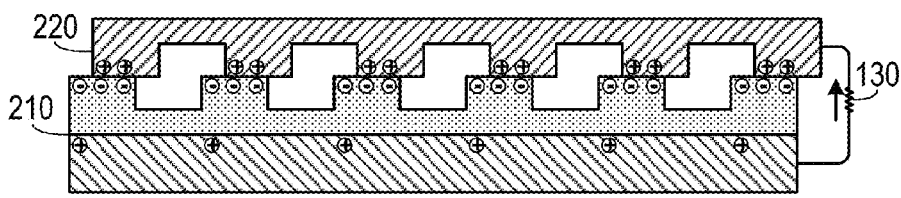

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Related U.S. patent application Ser. No. 13/598,132, filed on Aug. 29, 2012 by Wang et al. and Ser. No. 14/032,864, filed on Sep. 20, 2013 by Wang et al. disclose methods of making triboelectric generators and components thereof and are both incorporated herein by reference for the purpose of disclosing such methods.

The present invention includes a triboelectric nanogenerator (TENG) that converts small-scale mechanical energy into electricity by sliding two surfaces laterally against each other. The principle of the TENG is based on sliding electrification between two surfaces, which expands the applicability of the TENG for diverse forms of mechanical motions.

As shown in FIGS. 1A-1D, a basic sliding embodiment of a TENG 100 includes a first member 110 disposed oppositely from a second member 120. The first member 120 includes a first electrode 112 and a first dielectric layer 114 coupled thereto. The second member 120 can serve as both a contact surface and an electrode. In one embodiment, the second member 120 can simply include a layer of aluminum (or other conductive material that is at a different position on a triboelectric series that the first dielectric layer 114), the first dielectric layer 114 can include a PTFE film and the first electrode 112 can include a metal, such as copper. The first electrode 112 may be coupled to the second electrode 120 through a load 130. (While not shown in FIGS. 1A-1D for the sake of simplicity, both the first member 110 and the second member 120 may each be mounted on a suitable substrate, such as an acrylic plate.) The first member and the second member do not have to be planar. They can be curved surfaces as long as they are parallel and have conformal contact with each other.

When the first dielectric layer 114 is placed against the second member 120, as shown in FIG. 1A, the triboelectric effect causes electrons to be transferred from the second member 120 to the first dielectric layer 114, thereby causing a net negative charge in the first dielectric layer 114 and a net positive charge in the second member 120. As the first member 110 is in contact with the second member 120 over their entire surfaces, the charges are balanced out. However, when a lateral force is applied to the second member 120 causing it to slide away from the first member 110, as shown in FIG. 1B, then the extra electrons in the first dielectric layer 114 stay in place due to the charge immobility associated with a dielectric while positive charges in the second member 120 move away from the first dielectric layer 114, causing a potential imbalance between the first member 110 and the second member 120. This then causes electrons to flow from the first electrode 112 through the load 130 to the second member 120. When the second member 120 is slid at its maximum offset from the first member 110, as shown in FIG. 1C, all of the negative charges held by the first dielectric layer 114 are balanced with corresponding positive charges in the first electrode 112 while the second member 120 is electrically neutral.

When the second member 120 is slid back over the first member 110, as shown in FIG. 1D, electrons flow back from the first electrode 112 through the load 130 into the second member 120, thereby more closely balancing the charges with the first dielectric layer 114. This causes a current to flow through the load 130 in an opposite direction from the direction it flowed during the motion shown in FIG. 1B. Once the second member 120 returns to the position shown in FIG. 1A, the charges are again balanced between the first dielectric layer 114 and the second member 120. (The same would hold true if the first member 110 is slid over the second member 120, or if both members are in motion so that there is relative sliding motion between the two members.)

The cycle shown in FIGS. 1A-1D can repeat itself, thereby generating an alternating current, if the TENG 100 is adapted with a sliding mechanism to receive force from a reciprocating motion source. The force can be directly applied, or it can be an inertial force due to acceleration. For example, the reciprocating motion source could be the repetitive footfalls of a person walking, or wave motion, or motion coming from a biological system—such as a heartbeat, or gusting wind, or one of many other types of repetitive motion.

One experimental embodiment of a TENG has a structure in which two contacting surfaces that can slide smoothly with one against the other. Acrylic was selected as a substrate material due to its decent strength, light weight and good machinability. On one substrate, aluminum thin film plays dual roles of an electrode and a sliding surface. On the other substrate, copper electrode is sandwiched between the substrate and a PTFE film. The PTFE film acts as another sliding surface. At its original position, the two sliding surfaces are fully aligned, with one sitting freely on the other. Driven by a tangential force applied to a substrate, relative displacement in contact mode occurs in lateral direction. After the two surfaces are fully displaced, the reciprocating force retraces them back to the aligned position.

The principle of the TENG is explained by the coupling between triboelectric effect and electrostatic effect. Once the PTFE film is brought into contact with the aluminum thin film, surface charge transfer takes place due to the triboelectric effect or contact electrification. Since PTFE is much more triboelectrically negative than aluminum, electrons are injected from aluminum into PTFE. At the aligned position, though triboelectric charges present on the surfaces, positive ones on aluminum are fully compensated by the negative ones on PTFE, producing no electric field in the surrounding space if the electric field at the edge is ignored. Once a relative displacement is introduced by an externally applied force in the direction parallel to the surfaces, triboelectric charges are not compensated at the displaced/mismatched areas, resulting in the creation of an effective dipole polarization parallel to the direction of the displacement. Therefore, the uncompensated charges generate electric potential difference (EDP) across the two electrodes. If the electric potential of the copper electrode is set to be zero, the EDP can be analytically expressed as a function of the displacement under simplified approximations.

$$EPD = U_{Al} - U_{Cu} \tag{1}$$

$$= \frac{q}{2\pi\varepsilon_0 WL} \int_0^t \tan^{-1}\left(\frac{l}{t}\right) dt$$

$$= \frac{q}{2\pi\varepsilon_0 WL} \left[\frac{l}{2}\ln(t^2 + l^2) + t\tan^{-1}\left(\frac{l}{t}\right)\right]$$

where l is the mismatched displacement between the two sliding plates, q is the quantity of the triboelectric charges on one plate, $\varepsilon_0$ is the vacuum permittivity, L is the length of the TENG's plate, W is the width of the TENG, and t is the thickness of the PTFE film.

If the two electrodes are electrically connected, once displacement is established, the uncompensated negative triboelectric charges on PTFE will repulsively drive free electrons on the copper electrode to the aluminum electrode, neutralizing the positive triboelectric charges and leaving behind positive induced charges. The flow of induced electrons lasts until the displacement reaches the maximum. Based on assumptions made in the analytical model, the induced charges equal the triboelectric charges in quantity. Therefore, at fully displaced position, the positive triboelectric charges are completely balanced out by induced electrons, indicating no more current flow. As the displacement is diminished by the reciprocating force, the induced electrons flow back to the copper electrode until the fully aligned position is restored. Therefore, in the entire process, alternating current (AC) is produced through the external load.

To characterize the performance of an TENG with a plate size of 6.4 cm by 3.8 cm, the short-circuit current ($I_{sc}$) and open-circuit voltage ($V_{oc}$) were measured at an average sliding velocity of 0.6 m/s introduced by a linear motor. It was found that the $I_{sc}$ exhibits peaks of alternating directions. Increasing displacement gives a positive current peak, while shrinking displacement leads to a negative one. No electric current is produced at either aligned or entirely displaced position. The $V_{oc}$ switches between zero and a maximum value, which corresponds to the aligned and fully displaced positions, respectively. Enabled by a full-wave diode bridge, the AC electric output can be rectified to a DC signal. With a diode bridge, the total accumulative induced charges, independent of sliding direction, can be added up. In this embodiment, 3 very step represents an output current resulting from a one-way sliding motion, generating 0.6 μC of induced charges on average. Correspondingly, the area density of the triboelectric charges is calculated to be 257 $\mu C/m^2$.

In an experimental embodiment of such a dielectric-dielectric system, the sliding-triboelectric nanogenerator includes two plates (71 mm×50 mm) with glass slides as the supporting substrates to ensure the surface flatness. Polyamide 6,6 (Nylon) and polytetrafluoroethylene (PTFE) films, the two polymers at the opposite ends of the triboelectric series, are chosen as the triboelectric layers adhered on surfaces of the glass slides for effective electrification during sliding. On each polymer film, a layer of metal electrode was deposited on the side next to the glass slide (named as top electrode for the one on Nylon and bottom electrode for the one on PTFE). The two plates are kept in parallel to each other and the polymeric surfaces are in intimate contact. As driven by the mechanical motion/vibration along the long-edge of the plate, the two plates slide against each other, with the contact area changing periodically. In order to enhance the triboelectric charge density on the surface, the PTFE film was dry-etched using inductive coupled plasma (ICP) to create aligned nanowire-structures, which increase the surface roughness and the effective surface area. The PTFE surface is uniformly covered with nanowire-structures, with an average length of ~1.5 μm. The PTFE-covered plate was bonded to a stationary stage, while the Nylon side was fastened to a parallel flat-end rail guide, which was connected to a linear motor for inducing an in-plane sliding motion.

In this embodiment, the triboelectrification will leave the Nylon surface with net positive charges and the PTFE with net negative charges with equal density. Since the tribo-charges on the insulators will only distribute in the surface layer and will not be leaked out for an extended period of time, the separation between the positively-charged surface and negatively-charged surface is negligible at this overlapping position, and thus there will be little electric potential drop across the two electrodes. Once the top plate with the positively-charged surface starts to slide outward, the in-plane charge separation is initiated due to the decrease in contact surface area. The separated charges will generate an electric field pointing from the right to the left almost parallel to the plates, inducing a higher potential at the top electrode. This potential difference will drive a current flow from the top electrode to the bottom electrode in order to generate an electric potential drop that cancels the tribo-charge-induced potential. Because the vertical distance between the electrode layer and the tribo-charged polymeric surface is negligible compared to the lateral charge separation distance, the amount of the transferred charges on the electrodes approximately equals the amount of the separated charges at any sliding displacement. Thus, the current flow will continue with the continuation of the on-going sliding process that keeps increasing the separated charges, until the top plate fully slides out of the bottom plate and the tribo-charged surfaces are entirely separated.

Subsequently, when the top plate is reverted to slide backwards, the separated charges begin to get in contact again but no annihilation due to the insulator nature of the polymer materials. The redundant transferred charges on the electrodes will flow back through the external load with the increase of the contact area, in order to keep the electrostatic equilibrium. This will contribute to a current flow from the bottom electrode to the top electrode, along with the second half cycle of sliding. Once the two plates reach the overlapping position, the charged surfaces get into fully contact again. There will be no transferred charges left on the electrode, and the device returns to the initial state in. In this entire cycle, the processes of sliding outwards and inwards are symmetric, so a pair of symmetric alternating current peaks should be expected.

The model constructed here has the same structure and dimensions (71 mm×50 mm in surface) with the real device, and those two tribo-charged surfaces are assigned with a charge density of ±70 $\mu C/m^2$, respectively. The device is in open-circuit condition, which means no electron transfer between the two electrodes. When the two plates are in the fully aligned stacking position, there is no potential difference generated. When the top plate slides about half way out (with a displacement of 41 mm), there will be a 2950 V potential difference between the two electrodes; and this potential difference will increase to $1.03 \times 10^5$ V when the top plate just slides out of touching the bottom plate (with a displacement of 71 mm). The voltage keeps increasing when the displacement gets larger, even after the plates slide out of each other. This is because the voltage is the path-integral of the electric field along the displacement. On the other hand, the amounts of transferred charges between the two electrodes under these different displacements are also simulated through equating the potential of the electrodes at the short-circuit condition. The amount of transferred charges increases linearly with the displacement before the top plate slides out of the bottom plate (with the displacement smaller than 71 mm). Different from the trend of the voltage, the amount of transferred charges will saturate at the total amount of tribo-charges on one surface after the plates have fully slid out of each other, because there is no further charge separation here. So, the effective displacement region for generating electricity is between 0 mm and 71 mm, where the contact area of the two plates is changed during the relative sliding of the two plates.

The electrical output of the sliding-TENG was measured, with one plate guided by the linear motor in the direction parallel to the long-edge of the plates. The sliding displacement was 71 mm, which was the same with the length of the plate and thus covered the entire effective region for generating electricity. The sliding movement was in a symmetric acceleration-deceleration mode, with the acceleration rate of ±20 m/s². The open-circuit voltage ($V_{OC}$) was measured by an electrometer with very large input resistance. The electrode at the back of Nylon film was connected to the positive probe. When the plates in the TENG slid from the contact position to the separated position, the $V_{OC}$ jumped from 0 to ~1300 V, which reflects the induced potential difference between the two electrodes by the in-plane charge separation. At the separation position, the $V_{OC}$ decayed a little bit, due to the slow charge leakage through the electrometer. When the TENG slid back to the contact position, the $V_{OC}$ jumped back to 0. The density of the transferred charge ($\Delta\sigma$) was also measured at the short-circuit condition. Charges with a density of ~105 μC/m² transferred back and forth between the two electrodes, while the plates slid in and out. Since the plates got fully separated in each cycle, the transferred charge density should approximately equal to the triboelectric charge density on the polymeric surfaces. With these experimental results, the measured $V_{OC}$ is smaller than the simulated potential difference, which is possibly due to the limitation of the electrical measurement system to record such a high voltage and the imperfection from the ideal open-circuit condition. The transfer of the charges between the electrodes in the outer circuits produced an alternating-current output, with the peak short-circuit current density ($J_{SC}$) of 4.1 mA/m² at a maximum sliding velocity of 1.2 m/s. In this experimental embodiment, with such a power output converted from the sliding motion, hundreds of commercial light-emitting diodes (LEDs) were instantaneously driven by a single TENG device.

The TENG's effective output power to the loads depends on the match with the resistance of the load. When the resistance is below ~1 MΩ, the output current density and the voltage have little changes from the short-circuit condition: the current density remains at a value of $J_{SC}$ while the voltage stays close to 0. This is because the TENG has infinitely-large inner resistance. When the resistance goes beyond 1 MΩ, the current density will drop with the increase of the resistance; while the voltage on the load increases. Consequently, the instantaneous power density on the load remains close to 0 with the resistance below 1 MΩ, and reaches the maximum value of 0.42 W/m² at a resistance of ~50 MΩ. This is the maximum output power density on the device.

The output of the planar-sliding-driven TENG is directly determined by the parameters of the sliding motion—the displacement and the velocity, because the flow of electricity originates from the tribo-charge separation under sliding. As simulated, before the two plates fully slide out of each other (with a displacement smaller than 71 mm), the voltage increases monotonically with the displacement. Also, if there is a uniform tribo-charge distribution on the polymeric surface, the total amount of transferred charges will have a linear relationship with the displacement, which can be expressed in charge density as:

$$\frac{\Delta\sigma}{\sigma_0} = \frac{\Delta L}{L_0} \quad (2)$$

where $\Delta\sigma$ is the transferred charge density, $\sigma_0$ is the tribo-charge density on the polymeric surface, $\Delta L$ is the sliding displacement and $L_0$ is the length of the plate which is 71 mm. According to the definition of current density (J), it has the following relationship:

$$J = \frac{d\Delta\sigma}{dt} \quad (3)$$

where t is the time. Merging equation (2) into (3) results in $$J = \frac{\sigma_0}{L_0} \cdot \frac{d\Delta L}{dt} = \frac{\sigma_0}{L_0} v \quad (4)$$

where v is the instantaneous velocity of the sliding. So, the current density should be proportional to the instantaneous velocity at which the two plates are being separated.

A systematic study of these relationships between the electrical outputs ($V_{OC}$ and $J_{SC}$) and the sliding conditions was carried out experimentally. In the first group of experiments, the electrical outputs were measured under a series of 7 different sliding displacements from 11 mm to 71 mm, with an acceleration kept at 20 m/s². It was found that, the $V_{OC}$ increases with the displacement, which is in accordance with simulation results. The measured transferred charge density $\Delta\sigma$ displays a linear relationship with the displacement, which can be linearly fitted with the correlation coefficient of 0.981. As for the peak value of $J_{SC}$ which is in proportional to the maximum velocity $v_m$, it also has a positive correlation with the displacement. This is because $v_m$ has such a relationship with the displacement:

$$v_m = \sqrt{\alpha\Delta L} \quad (5)$$

where $\alpha$ is the acceleration and $\Delta L$ is the total displacement (the displacement for each acceleration and deceleration process is $\Delta L/2$, respectively).

When the sliding displacement remains at a constant value of 71 mm, the maximum velocity of the sliding is solely determined by the acceleration. Thus, the acceleration was varied to investigate the velocity's influence on the output. It was found that $V_{OC}$ has very little increase with the rising acceleration, which is also consistent with the theoretical expectation that $V_{OC}$ is only determined by the displacement. However, the changing rate of the voltage will depend on the sliding velocity. The higher the velocity, the faster the voltage increases/decreases in sliding. As for the output current, the peak value of $J_{SC}$ gets larger at higher acceleration, because of the larger maximum velocity in sliding. However, the sliding velocity has no influence on the transferred charge density $\Delta\sigma$ under the constant displacement.

Because the essence in the working mechanism of the sliding-TENG is the cycled switching between the separation and full contact of the opposite tribo-charges, there should be little electricity generated in the following two cases: (1) If the sliding motion does not result in the change of the contact area between two plates, for example, if a smaller plate slides inside the perimeter of a larger plate at all time, then little output can be measured. This is because there is no polarization generated in this case. (2) If the two plates do not fully in tight contact with each other at the overlapping position, there is always a vertical gap distance between them, which results in two cases: the first is that little triboelectric charges are generated; the second case is that if there are triboelectric charges on the plates, the gap between them in the vertical direction quickly decays the strength of electrostatic interaction, resulting in a reduced output. When the vertical distance between the two plates of the TENG is gradually increased from 0 to 2 mm, the output voltage, current and transferred charges all quickly decay to zero.

The planar sliding mode TENG disclosed herein has several advantages, including: (1) This TENG design does not need a gap between the two plates. Thus it will be unnecessary to have elastic supporting components (such as springs) between the two plates to ensure the effective charge separation. This brings up a lot of convenience in packaging the TENG device; (2) there is no need for a large amount of mechanical energy input to trigger this TENG design, which can help to improve the energy harvesting efficiency. The mechanical energy only needs to overcome the work done by the sliding friction between the two plates. (3) This TENG design is simple in structure, easy in fabrication, compact in volume, stable in performance, cost-effective and robust. With these advantages, such in-plane charge-separation-based TENGs can harvest mechanical energies in the form of relative sliding that are supplied by many different working configurations, for example, the relative rotation of two contacting plates, the vibration of the piston, the rotation of the axis to its tube, and so on. Besides, those types of mechanical energy that can drive the relative sliding between two objects can also be harvested using this principle of in-plane charge-separation-based TENG, which can greatly expand the application of this type of TENG to scavenge mechanical energy from wind power, oceanic wave, human activities, and so on.

As shown in FIGS. 2A, 2B and 3A-3D, the first dielectric layer 214 can include a first grating of evenly spaced apart parallel ridges 216 and troughs 218. Similarly, the second member can include a second grating first grating of evenly spaced apart parallel ridges 226 and troughs 228. As can be seen in FIGS. 3A-3D, while the overall surface contact area density of this embodiment is essentially one half that of the embodiment shown in FIG. 1A-1D, the total sliding distance necessary for maximum charge transfer is limited to the width of a single ridge. Thus, depending on the width of the ridges (which can be microscale using lithographic techniques), this embodiment can generate its maximum current with an extremely small scale source of reciprocal motion (such as vibrations). These embodiments can be made using well known thin film application processes for applying layers to the substrates and standard lithographic techniques for etching the troughs.

Figure 4A:
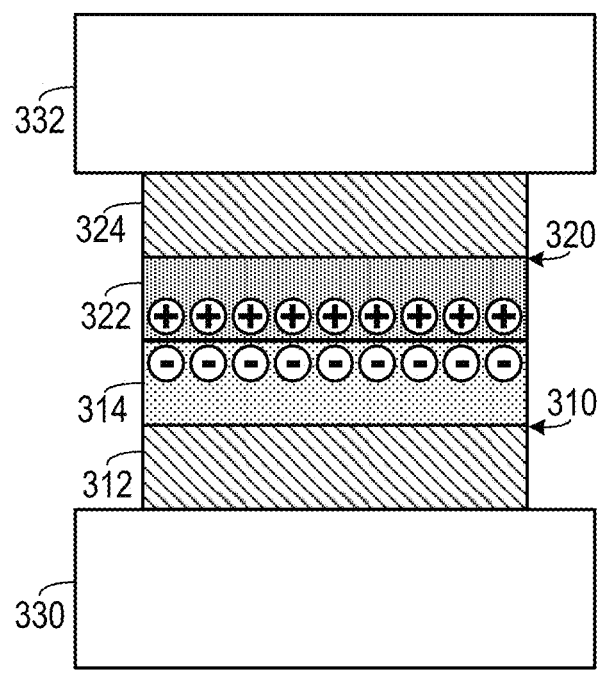
FIGS. 4A and 4B are side elevational view of triboelectric generating devices employing two dielectric layers.
Figure 4B:
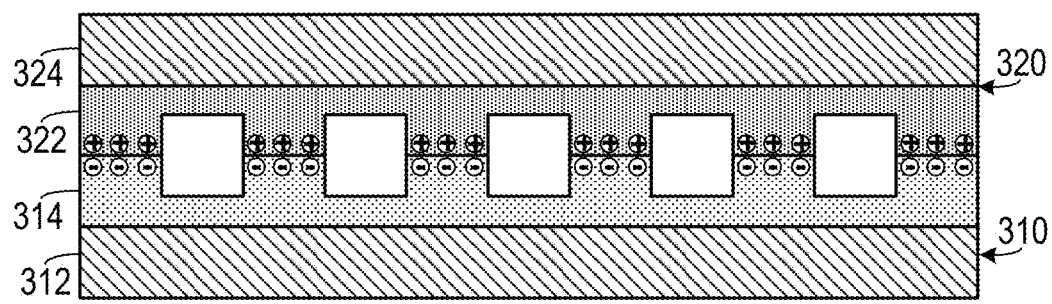

As shown in FIG. 4A, one embodiment includes: a first member 310 having a first electrode 312 mounted on a first rigid substrate 330 and a first dielectric layer 314 applied thereto, and a second member having a second electrode 324 mounted on a second rigid substrate 332 and a second dielectric layer 322 mounted thereto. As shown in FIG. 4B, a two dielectric layer embodiment can also include gratings formed in the first dielectric layer 314 and the second dielectric layer 322.

Introducing linear grating on the sliding surfaces enables the new principle to become an extremely efficient means for energy harvesting; and it is far superior to the previously demonstrated ones in total output charge, current frequency and efficiency. A linear grating with a uniform period is fabricated on both sliding surfaces. The rows of the grating units have the same size as intervals in between, with all rows being electrically connected at both ends by two buses. The grating patterns on both sliding surfaces are identical so that they can match well with each other when aligned. Although the grating design reduces the total contact area by half thus seemingly sacrifices half of the triboelectric charges, it increases the percentage of the mismatched area to 100% for a displacement of only a grating unit length rather than the entire length of the TENG so that it dramatically increases the transport efficiency of the induced charges. Induced free electrons can be pumped back and forth between electrodes for multiple times due to the grating structure, providing multi-folds of output charge compared to a non-grating TENG. Every row of the grating units can be considered as a reduced-sized TENG having a parallel connection with all other rows through buses. In contrast to a non-grating TENG that needs to be fully displaced in order to complete pumping of the induced charges for one time, the grating TENG only requires a displacement of a unit length to completely transport the induced charges, largely improving the energy conversion efficiency. With further displacement of another length of the unit, back flow of the induced charges can be realized. Therefore, for a one-way sliding process across the whole length of the TENG, the induced charges can be pumped for (2N−1) times in total, where N is the number of grating units. If we take into account that the contacting area decreases as the two surfaces slide apart, the following equation represents the total induced charges Q that the grating TENG can provide for a single sliding across the entire length of the TENG:

$$Q = Nq' + |-q' \times (N-1)| + q' \times (N-1) + \ldots + |-q'| + q' \quad (6)$$
$$= Nq' + 2q' \times \sum_{i=1}^{N-1} i$$
$$= (2q'N)N/2$$

where q' is the induced charges generated from a single grating unit for a displacement of the unit length.

The total maximum induced charges generated by a non-grating TENG can be equivalently expressed as 2q'N. Therefore, Eq. (6) indicates that the total induced charges linearly increase with the grating density. Experimental data from grating TENGs with more units further confirm the validity of the theoretical analysis.

Though the experimental data closely match the theoretical values for N≤4, slight deviation starts to appear if N further increases. The deviation may be attributed to two probable reasons. The first is non-ideal orientation mismatch. The two sliding surfaces are likely to have an angle of mismatch that is introduced by experimental operation. As the length of the grating units shrinks, the angle of mismatch will exert more substantial effect on the effective contact area between the two surfaces, leading to increasingly reduced output charge. This effect can be largely eliminated by more precise alignment during experiment operation. Secondly, assumptions made in the analytical theory may become imprecise for very fine grating units due to the edge effect of each unit. The assumption of infinite charged plane will no longer hold once the grating edges can dominantly affect the electric field distribution, leading to reduced quantity of induced charges. Further systematic investigation by both experiment and simulation is required to quantitatively understand this non-ideal effect. As experimentally observed, $V_{oc}$ is only weakly related to the number of grating units, though slight reduction can be observed. The reduction can also be attributed to the increasingly stronger effect from the mismatched angle. Besides, finer grating units will theoretically give a smaller $V_{oc}$, though this effect may be dominant only when the grating unit has a length approaching the PTFE's thickness. The advantages of the grating structure include not only the enhanced total transported charges but also improved output current. With constant sliding velocity, finer grating shortens the time to transport induced charges between the electrodes for one time, resulting in higher output current. However, the peak of $I_{sc}$ does not increase linearly with the number of units, which may result from non-uniform velocity during sliding process.

To demonstrate the capability of the new principle as a direct power source, a total of 80 commercial LED bulbs were utilized as operating load. They were divided into two groups, which were connected to a TENG with reversed polarity in order to clearly demonstrate the AC output without rectification. One substrate of the TENG was fixed on a breadboard where the LEDs were installed, while the other one was attached to human fingers. As the hand swept back and forth, the sliding was realized. It was noticed that faster sweeping generated higher current peaks as compared with those from slower sweeping. Due to the AC output, the two LED groups were alternately lighted up, as indicated by "ON" and "OFF" states.

Figure 5:
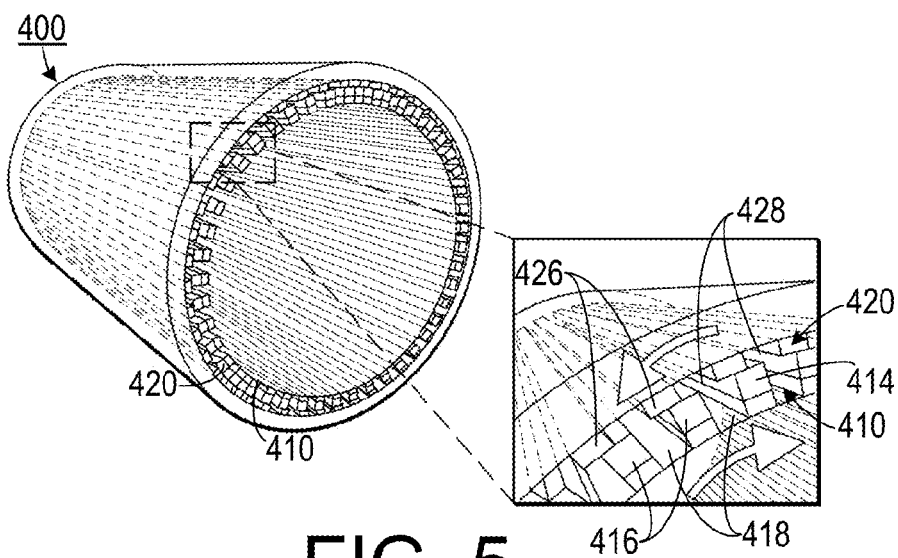
FIG. 5 is a perspective view of a cylindrical embodiment of a grooved triboelectric generator in which the groves run along a cylindrical axis.
Figure 6:
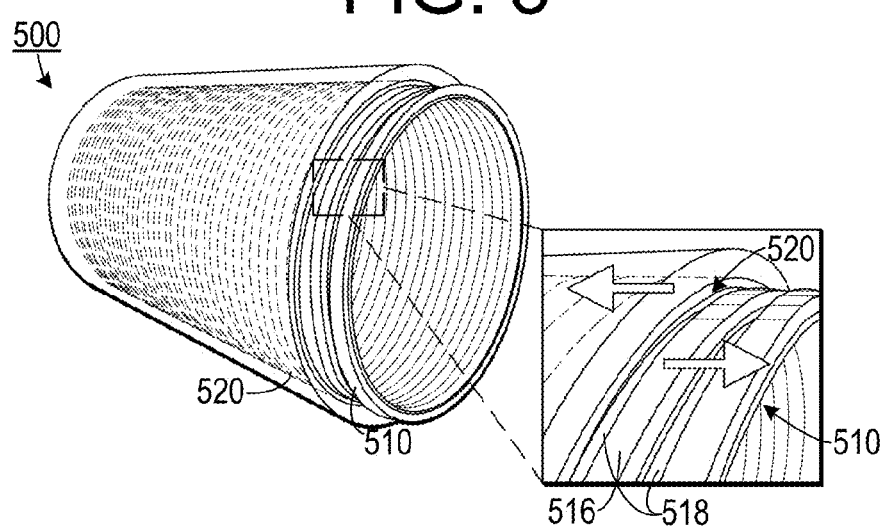
FIG. 6 is a perspective view of a cylindrical embodiment of a grooved triboelectric generator in which the groves run transverse to a cylindrical axis.
Figure 7:
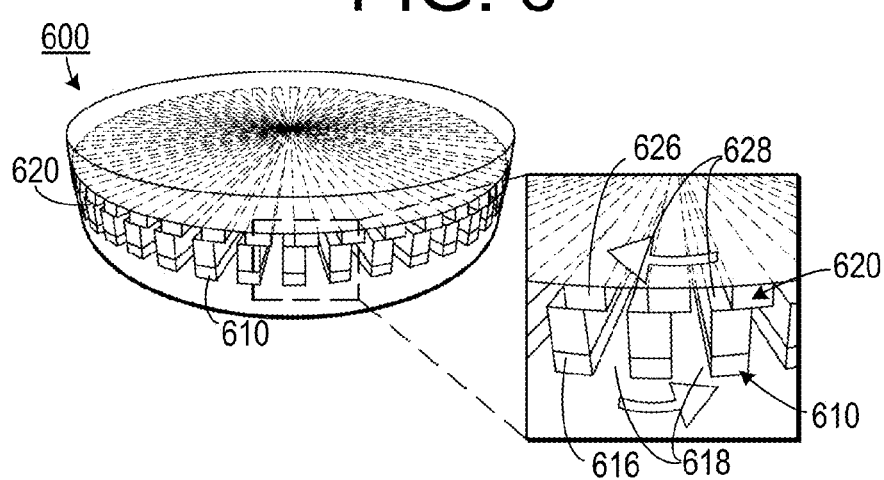
FIG. 7 is a perspective view of a disc-shaped embodiment of a grooved triboelectric generator in which the groves extend radially from a central axis.

Besides the planar design, other configurations include, concentric discs having relative rotation and coaxial tubes having either rotational motion or reciprocating piston motion. The principles demonstrated for the grating TENG can be applied to other configurations. For example, as shown in FIG. 5, in one embodiment of a TENG 400 the first member 410 and the second member 420 are cylindrical. The first dielectric layer 414 includes a first grating of evenly spaced apart parallel ridges 416 and troughs 418 and the second member 420 includes a second grating of parallel ridges 426 and troughs 428. All of the ridges and troughs extend parallel to the axis of the cylinder. Thus, when either the first member 410 or the second member 420 is rotated about the cylindrical axis (or both rotated so long as there is relative motion between them), the ridges of the second member 420 and the first member 410 will come in and out of contact. This embodiment is effective when it is desired to turn rotational motion into electricity. In the embodiment shown in FIG. 6, the ridges 516 and troughs 518 of the first grating and the second grating are disposed circumferentially about the cylinder and the sliding mechanism is configured to apply reciprocating motion along the cylindrical axis to either the first member 510 or the second member 520 (or both so long as there is relative motion between them), thereby converting the reciprocating motion into electricity. In the embodiment shown in FIG. 7, the ridges 616 and troughs 618 of the first grating and the second grating extend radially outwardly from a central axis of a disk. Electricity is generated when at least one of the first member 610 and the second member 620 is caused to rotate around the central axis of the disks (or both can be rotating so long as there is relative rotational motion between them).

Figure 8:
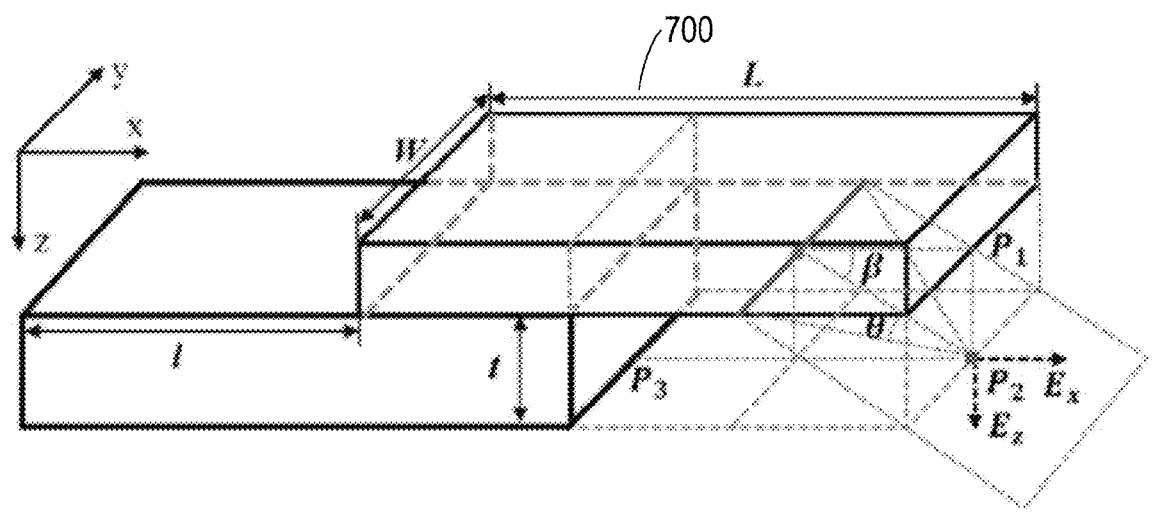
FIG. 8 is a schematic diagram showing dimensions of a triboelectric generator used in analysis thereof.

An analytical model for calculating the open-circuit voltage of a TENG 700 is now presented using the diagram shown in FIG. 8. For simplicity of the mathematical derivation, the analytical model is built based on the following assumptions:

(1) The two sliding surfaces of the TENG are infinitely large because the lateral dimension is much larger than the vertical thickness.

(2) The generated triboelectric charges, which are non-mobile and non-annihilative, are uniformly distributed on the two surfaces. This is an excellent approximation if the two materials are insulative. In a case that one side is metal, this approximation is made for easy derivation.

(3) Both the aluminum and the PTFE thin film can be simplified as planar surfaces which retain their shapes instead of having deformation when sliding laterally. Once the two surfaces contact with each other, triboelectric charges are created due to contact electrification. Based on assumption (2) and assumption (3), the lateral displacement l brings about uncompensated positive and negative triboelectric charges in the displaced areas on the upper surface and the lower surface, respectively.

If we define the electric potential of the copper electrode ($U_{Cu}$) to be zero, the open circuit voltage of the TENG is equal to the electric potential of the electrode electrode ($U_{Al}$), that is, $$V_{oc} = U_{Al} - U_{Cu} = U_{Al} = U_{P_1} - U_{P_3} \tag{S1}$$

Also, the electric potential difference can be expressed as $$U_{P_1} - U_{P_3} = \int_{P_1}^{P_3} E \cdot dl_{1 \to 3} = \int_{P_1}^{P_2} E_{1 \to 2} \cdot dt + \int_{P_2}^{P_3} E_{2 \to 3} \cdot dl \tag{S2}$$

Meanwhile, given assumption (1) and (2), we can consider the upper surface as charged plate of infinity in size, so that the electric lines of force are perpendicular to the surface of the plate as well as the patch from $P_2$ to $P_3$. As a result $$\int_{P_2}^{P_3} E_{2 \to 3} \cdot dl = 0 \tag{S3}$$

and $U_{Al} = \int_{P_1}^{P_2} E_{1 \to 2} \cdot dt$ \hfill (S4)

In order to calculate the electric field strength $E_{1 \to 2}$ in the path from $P_1$ to $P_2$, let us consider an infinite, charged line in the displaced area on the upper surface. And the corresponding electric field strength $E_{sl}$ at $P_2$ can be quantitatively expressed as $$E_{sl} = \int_{-\theta}^{+\theta} \frac{\sigma}{4\pi\varepsilon_0} \cdot \frac{\cos\theta}{\sqrt{t^2+l^2}} \cdot d\theta = \frac{\sigma}{2\pi\varepsilon_0} \cdot \frac{\sin\theta}{\sqrt{t^2+l^2}} \tag{S5}$$

where $\varepsilon_0$ is the permittivity of vacuum, t is the thickness of the PTFE film, l is the displacement, and σ is the line charge density $$\sigma = \frac{q}{WL} \tag{S6}$$

where q is the total triboelectric charges, W and L are the width and length of the two sliding surfaces, respectively. Meanwhile, in our case, compared with the PTFE's thickness, the charged line is considered to be infinitely long, thus, $$\theta = 90° \tag{S7}$$

Upon combination and simplification, $E_{sl}$ can be expressed as $$E_{sl} = \frac{q}{2\pi\varepsilon_0 WL\sqrt{(t^2+l^2)}} \tag{S8}$$

However, only the component along Z axis of the electric filed strength $E_{sl}$ is parallel to the electric field, making the effective electric filed strength expressed as $$E_{eff} = E_{sl} \cdot \sin\beta \tag{S9}$$

-continued $$\sin\beta = \frac{t}{\sqrt{t^2 + l^2}} \quad (S10)$$

Upon combination and simplification, $$E_{\it eff} = E_{sl} \cdot \sin\beta = \frac{q}{2\pi\varepsilon_0 WL} \cdot \frac{t}{(t^2 + l^2)} \quad (S11)$$

Thus, the total electric filed strength $E_{1\rightarrow 2}$ generated at $P_2$ along the z-axis by the triboelectric charges on the entire displaced area of the upper surface can be calculated as $$E_{1\rightarrow 2} = \int_0^l \frac{q}{2\pi\varepsilon_0 WL} \cdot \frac{t}{(t^2 + l^2)} dl = \frac{q}{2\pi\varepsilon_0 WL} \cdot \tan^{-1}\left(\frac{l}{t}\right) \quad (S12)$$

Submit the Equation (S12) into the Equation (S4)

$$U_{Al} = \int_0^t E_{1\rightarrow 2} \cdot dt = \int_0^t \frac{q}{2\pi\varepsilon_0 WL} \cdot \tan^{-1}\left(\frac{l}{t}\right) dt \quad (S13)$$

Finally, the open-circuit voltage $V_{oc}$ between the two electrodes can be expressed as $$V_{oc} = U_{Al} = \frac{q}{2\pi\varepsilon_0 WL} \cdot \left[\frac{l}{2}\ln(t^2 + l^2) + t\tan^{-1}\left(\frac{l}{t}\right)\right] \quad (S14)$$

The energy conversion efficiency ($\eta\%$) can be estimated through the conversation of energy. According to the definition:

$$\eta\ \% \equiv \frac{E_{ele}}{E_{Mech}} \times 100\%$$

where $E_{ele}$ is the electrical energy generated in the half cycle of the displacement, and $E_{Mech}$ is the mechanical energy input. They can be estimated as follow.

The maximum electrical energy generated by the sliding TENG in a half-cycle, be estimated using the data of the TENG's output characteristic when driving external load. The highest power output is reached at the resistance of 80 MΩ, which will correspond to the maximum electric energy output ($E_{ele}$). It can be calculated according to the following equation:

$$E_{ele} = \int I^2 R dt$$

The curve of $I^2R$ vs. t (R=80 MΩ) can be derived from the corresponding I vs. t curve, and through the integration of one ($I^2R$) peak in a half-cycle, we can get:

$$E_{ele} = 0.145\ mJ.$$

In general, the mechanical energy input for driving the sliding TENG is converted into two parts: the electrostatic energy ($E_{es}$) of the two oppositely-charged plates at the fully displaced position, and the electrical energy ($E_{ele}$) the TENG generated in the sliding process.

As for the electrostatic energy $E_{es}$, it can be estimated as:

$$E_{es} = U_T\sigma_0 A + U_B(-\sigma_0)A = (U_T - U_B)\sigma_0 A = V_{OC}\sigma_0 A$$

where $U_T$ and $U_B$ are the potentials at the top plate and bottom plate, respectively; and A is the area of the plate, which is 35.5 cm². In this estimation, we assume each charged plane has a uniform potential, which is reasonable as shown in the simulated results of the potential distribution. From the electrical measurement of the TENG, $V_{OC}$ is ~1300 V and $\sigma_0$ is ~105 μC/m². Thus, we can get $$E_{es} = V_{OC}\sigma_0 A = 1300V \times 105 \times 10^{-6} \times 35.5 \times 10^{-4} C = 0.485\ mJ$$

Thus, the mechanical energy input $E_{Mech}$ can be estimated to be:

$$E_{Mech} = E_{es} + E_{ele} = 0.630\ mJ$$

The other part of energy input is the heat dissipated during mechanical sliding, which is rather difficulty to estimate for the current design. If we ignore this component, the maximum energy conversion efficiency can be estimated as follows:

$$(\eta\ \%)max \equiv \frac{E_{ele}}{E_{Mech}} \times 100\% = \frac{0.145\ mJ}{0.630\ mJ} \times 100\% = 23.0\%$$

Figure 9:
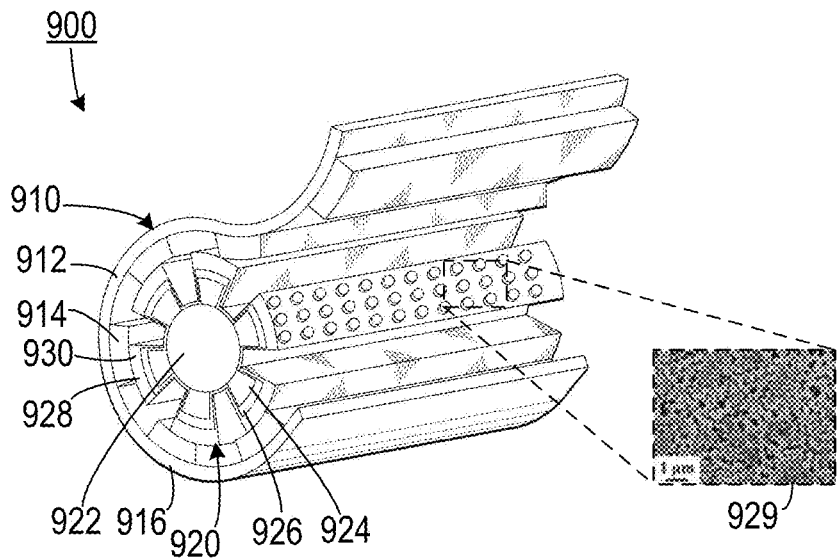
FIG. 9 is a perspective view of a second cylindrical embodiment of a grooved triboelectric generator in which the groves run along a cylindrical axis.

While many different materials can be organized according to a triboelectric series, the following is one representative example of a triboelectric series:
Asbestos
Glass
Mica
Nylon
Lead
Silk
Aluminum
Steel
Wood
Lucite
Amber
Hard Rubber
Mylar
Nickel
Copper
Silver
Brass
Synthetic Rubber
Gold, Platinum
Sulfur
Acetate, Rayon
Polyester
Celluloid
Polystyrene
Orlon, Acrylic
Polyvinylidene chloride (Saran)
Polyurethane
Polyethylene
Polypropylene
Polyvinylchloride (Vinyl)
PTFE
Silicon
Teflon
Silicone Rubber As shown in FIG. 9, one embodiment of a cylindrical rotating nanogenerator 900 includes an exterior cylindrical member 910 and an interior cylindrical member 920 disposed therein. The exterior cylindrical member 910 includes an outer cylindrical shell 912 made from a material such as acrylic and a first grating that includes a first plurality of ridges 914 extending inwardly therefrom and made from a conductive material such as copper. A first electrode lead 916 extends from one of the ridges 914. The interior cylindrical member 920 includes a cylindrical core 922, made of a material such as acrylic, with a second grating that includes a plurality of ridges extending outwardly therefrom. Each ridge includes a foam core 924 extending outwardly therefrom. A conductive cladding 926 (such as a copper cladding) is disposed about the foam core 924 and a triboelectric layer 928, which is made of a material (such as PTFE) that has a rating on a triboelectric series that is different from the rating of the material from which the first plurality of ridges 914 is made from. A nanoscale texture 929 is applied to the outer surface of triboelectric layer 928 using one of many known methods of generating a nanoscale texture (including lithography, etc.) to improve charge transfer characteristics. A second electrode lead 930 extends from the conductive cladding 926. In this embodiment, electrical current will be generated when there is relative rotational movement between the exterior cylindrical member 910 and the interior cylindrical member 920.

Figure 10:
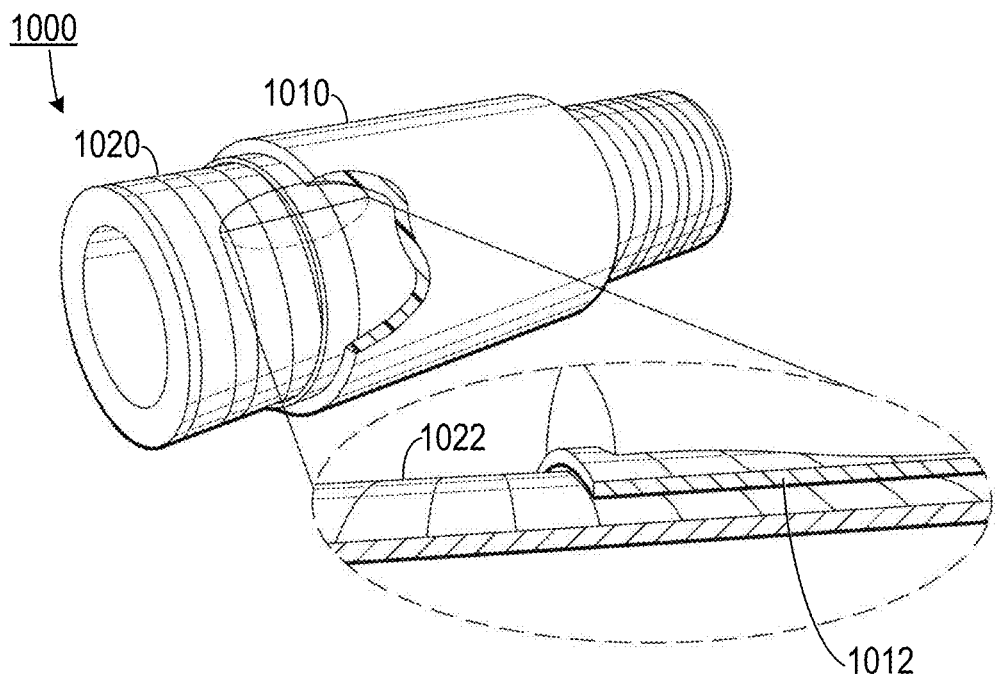
FIG. 10 is a perspective view of a second cylindrical embodiment of a grooved triboelectric generator in which the groves run transverse to a cylindrical axis.

As shown in FIG. 10, the exterior member includes a cylindrical cuff 1010 and a first grating 1012 that is disposed circumferentially to the cylindrical cuff 1010. The interior member includes a cylinder 1020, disposed inside of the cylindrical cuff 1010, and a second grating 1022 that is disposed circumferentially to the cylinder 1020. This embodiment will generate electricity when there is relative axial movement between cylindrical cuff 1010 and cylinder 1020.

Figure 11:
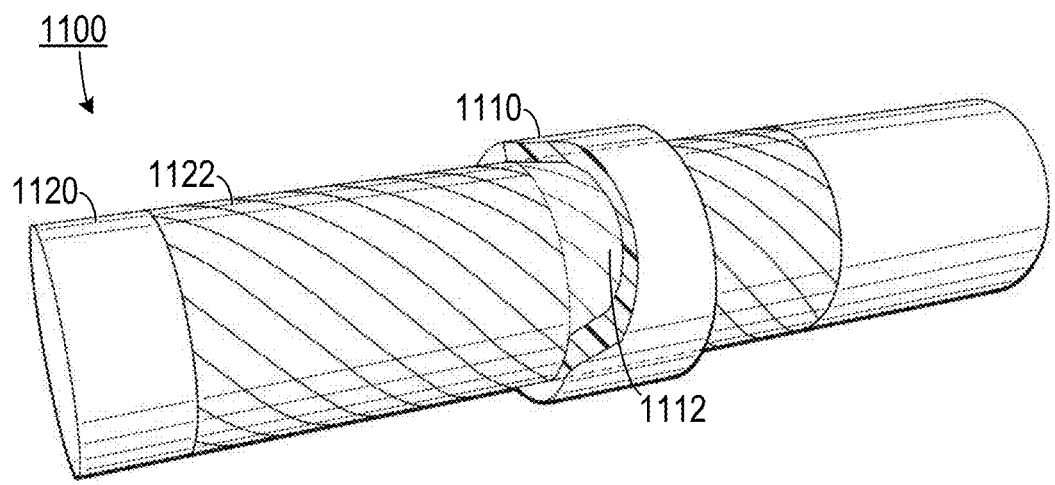
FIG. 11 is a perspective view of a cylindrical embodiment of a grooved triboelectric generator in which the groves run helically to a cylindrical axis.

A spiral embodiment triboelectric generator 1100 is shown in FIG. 11. This embodiment includes an exterior cylindrical member 1110, which could be made of a polymer foam, with a first grating 1112 disposed helically about the inside surface of the exterior cylindrical member 1110. An interior cylindrical member 1120 is disposed inside of the exterior cylindrical member 1110 and the second grating 1122 is helically disposed about the interior cylindrical member 1120 in a pattern that is complementary to the first grating 1112. This embodiment will generate electricity when there is relative movement (whether axial, rotational, or a combination of the two) between exterior cylindrical member 1110 and interior cylindrical member 1120.

One experimental embodiment was patterned with alternating Kapton and copper strips arranged at 45° spirals on both sides of the contact surface and packed in a case-encapsulated structure, the generator produced output signals with an amplitude of up to 30 V over an external load circuit. To fabricate the interfaces, a polyimide film (Kapton®) was used not only as a durable supporting substrate but also as a high-performance electrification material for generating the triboelectric charges during the sliding motion with copper electrodes. On either side of the Kapton film, copper stripes were deposited with a linear pitch of 8 mm. The electrode stripes on the 2 sides formed a linear shift of half a pitch giving rise to an alternating pattern with one another. The Kapton film was then wrapped over the acrylic cylinder with the strip direction at a 45° screw-angle with the cylinder axis. A second Kapton film with the same electrode pattern was encased in the foam cuff for producing the relative motion. An inner electrode (IE) was formed by stringing together the copper stripes at the two contact surfaces via bus electrodes. An outer electrode (OE) was formed by those on the other side of the Kapton film.

Another embodiment of a reciprocating motion generator 1200 is shown in FIGS. 12A-12G, in which a cylinder 1210 has top end capped by a top cap member 1214, an opposite bottom end capped by a bottom cap member 1220 and a piston 1230 that is slidably disposed within the cylinder 1210. The top cap member 1214 includes a first electrode layer 1216 and a first triboelectric material layer 1218 that includes a material having a first rating on a triboelectric series, such as, for example, polyamide. The bottom cap member 1220 includes a second electrode layer 1222 and a second triboelectric material layer 1224 that includes a material having a second rating on the triboelectric series, which could also be, for example, polyamide. The piston includes a cylindrical body portion 1231 that has a top surface and an opposite bottom surface. A third electrode layer 1232 is disposed on the top surface and a third triboelectric material layer 1234 is disposed on the third electrode layer 1232. The third triboelectric material layer 1234 includes a material that has a third rating on the triboelectric series (such as, for example polytetrafluoroethylene) that is different from the first rating on the triboelectric series. A fourth electrode layer 1236 is disposed on the bottom surface and a fourth triboelectric material layer 1238 is disposed below the fourth electrode layer 1236. The fourth triboelectric material layer 1238 includes a material (such as, for example, polytetrafluoroethylene) that has a fourth rating on the triboelectric series that is different from the second rating on the triboelectric series. In one embodiment, at least one of the triboelectric material layers 1218, 1234, 1238 and 1224 includes nanoscale texture on an outer surface thereof.

The electrode layers 1216, 1232, 1236 and 1222 each include conductive material, for example copper. A first load 1240 may be electrically coupled to the first electrode layer 1216 the third electrode layer 1232 and a second load 1242 may be coupled to the second electrode layer 1222 and the fourth electrode layer 1236.

In an experimental embodiment of a generator in an enclosed cylinder, two PA films with the Cu film electrodes were fixed on the top and bottom inside surfaces of the cylinder (length of 180 mm, diameter of 65 mm), respectively. A cylindrical piston was placed inside the cylinder, the top and bottom end surfaces of which were covered by the PTFE films with the Cu film electrodes. Two generators were fabricated at the top and bottom inside surfaces of the cylinder, respectively, and they can work alternately when the piston was shaken up and down inside the cylinder.

Figure 12A:
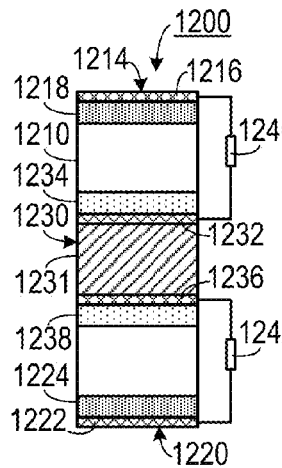
FIGS. 12A-12G are a series of schematic diagrams showing one embodiment of a reciprocating triboelectric generator.
Figure 12B:
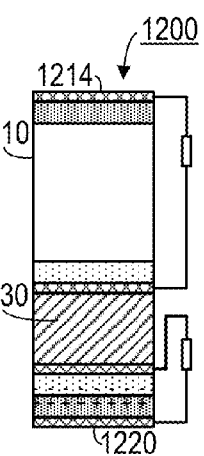
Figure 12C:
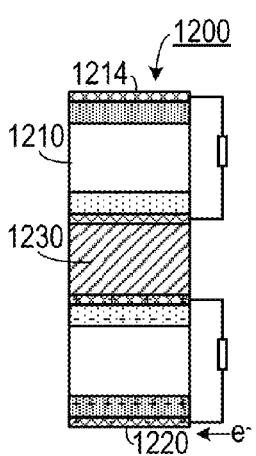
Figure 12D:
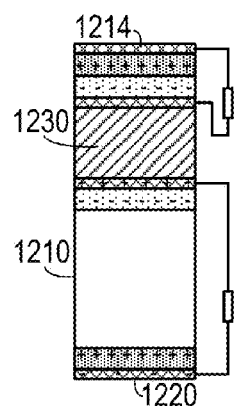
Figure 12E:
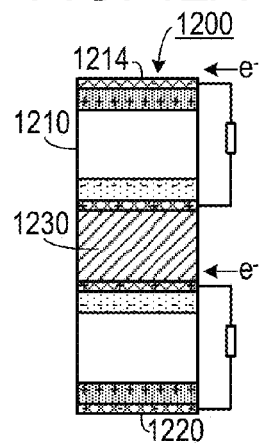
Figure 12F:
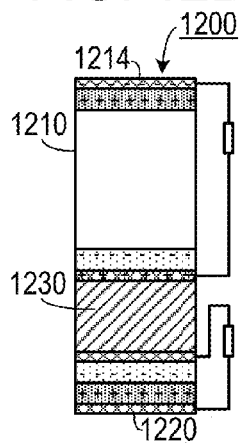
Figure 12G:
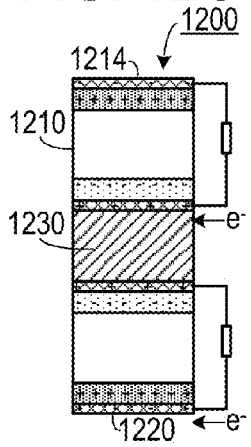

An initial state of the generator 1200 is shown in FIG. 12A and a cycle of successive states of the generator 1200 as it is being shaken laterally along the cylindrical axis is shown in FIGS. 12B through 12G (which represents a complete cycle that would typically be repeated many times). FIGS. 12A-12G demonstrate the working mechanism of the generators when the piston 1230 is moved up and down in the cylinder 1210. At original state (FIG. 12A), there is no triboelectric or induced charges in the system and no output voltage or current is observed. Considering the bottom portion of the generator 1200 (the top portion behaving in a complementary manner), when the PTFE 1238 and PA 1224 films are brought into contact with each other at the bottom of the cylinder 1210 (as shown in FIG. 12B), electrons are injected from the PA film 1224 to the PTFE film 1238 due to the different triboelectric polarities. Thus, the net negative and positive charges are induced at the PTFE 1238 and PA 1224 surfaces, respectively. These triboelectric charges have a long-time retention in the respective films due to the insulating property of the polymers. When the piston was moved up, electrons flow from the Cu electrode 1236 next to the PTFE film 1238 to the Cu electrode 1222 next to the PA film 1224 to balance the potential created by the triboelectric charges, resulting in the output current signals (as shown in FIG. 12C). When the piston is moved all of the way up, the top end cap is contacted and a similar process occurs. When the piston is moved down again (as shown in FIG. 12E), electrons flow back from the Cu electrode 1222 next to the PA layer 1224 to the Cu electrode 1236 next to the PTFE layer 1238, resulting in a negative current. When the PA film 1224 is once again in contact with the PTFE film 1238 at the bottom portion, there is no observed output current (as shown in FIG. 12F). When the piston is moved up again (as shown in FIG. 12G), electrons flow from the electrode 1236 next to the PTFE layer 1238 to the electrode next to the PA layer 1224, resulting in a positive current. The top portion works in the same way as the bottom portion except it has a 180° phase shift in output signals.

Figure 13A:
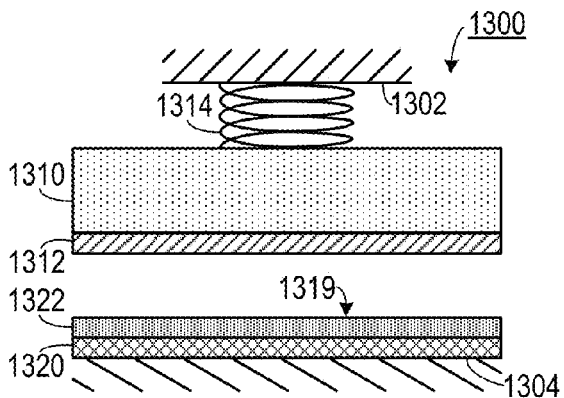
FIGS. 13A-13B are a pair of schematic diagrams showing one embodiment of a spring-type reciprocating triboelectric generator.
Figure 13B:
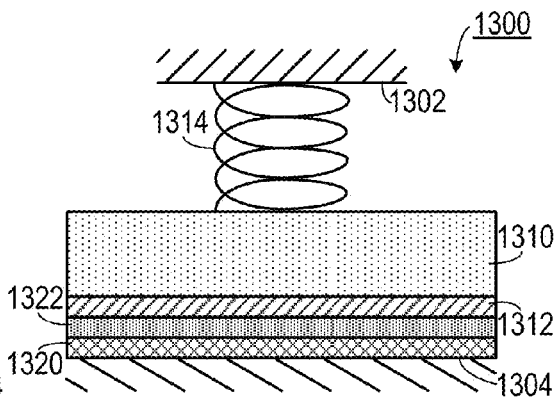
Figure 14A:
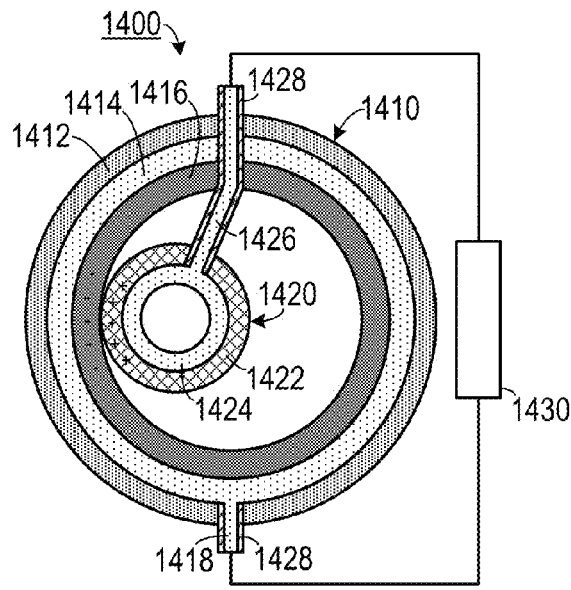
FIGS. 14A-14D are a series of schematic diagrams showing one embodiment of a spherical triboelectric generator.
Figure 14B:
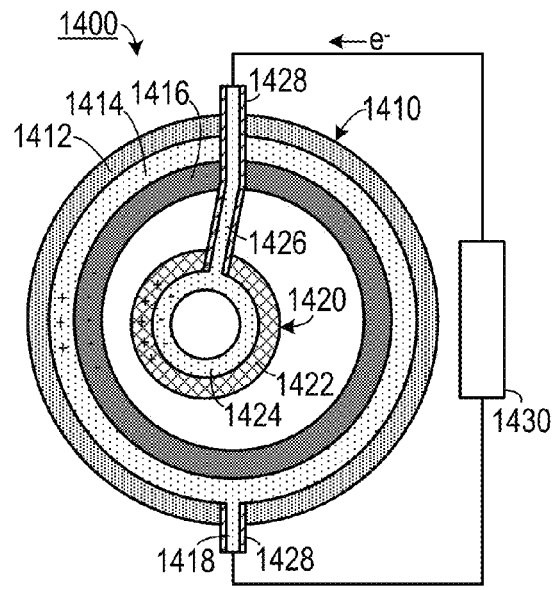
Figure 14C:
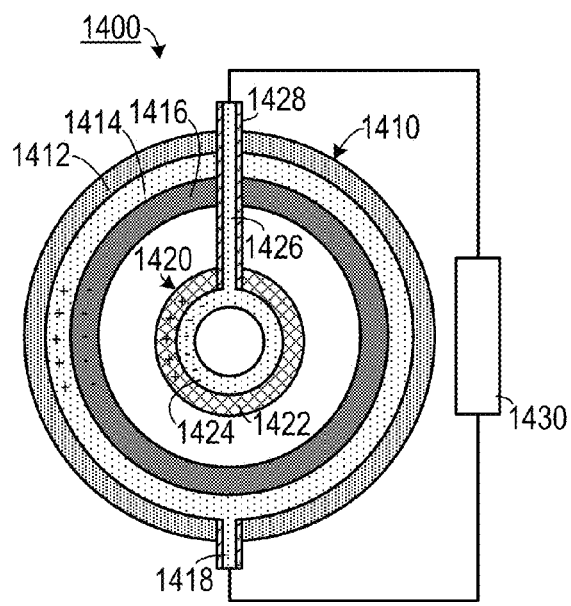
Figure 14D:
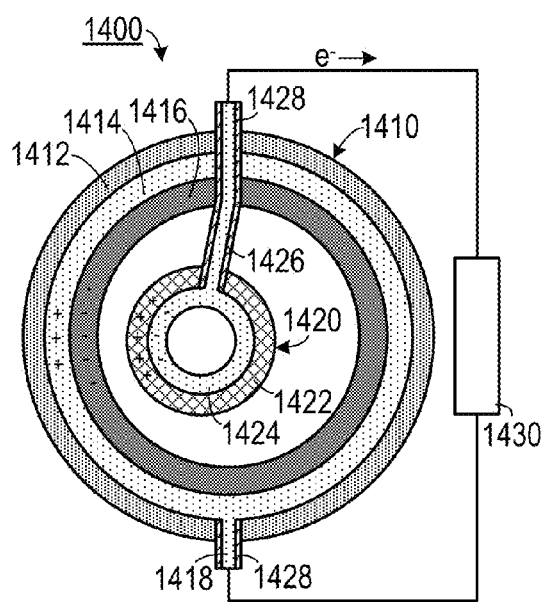

Yet another reciprocating motion triboelectric generator 1300 is show in FIGS. 13A and 13B. This embodiment includes a first reference surface 1302, to which a spring 1314 is affixed, and a spaced apart second reference surface 1304. An inertial member 1310 (which could include a material such as acrylic) is affixed to the spring 1314. A first triboelectric member 1312 is affixed to the bottom surface of the inertial member. The first triboelectric member 1312 includes a material (such as, for example, aluminum) that has a first rating on a triboelectric series. If made from a conductive material, the first triboelectric member 1312 can also act as a conductive layer. A second triboelectric member 1319 is affixed to the second reference surface 1304. The second triboelectric member 1319 includes a material 1322 (such as, for example, a polyimide film) that has a second rating on the triboelectric series that is different from the first rating and a conductive layer 1320 (which could include, for example, copper). A dielectric layer is disposed between the conductive layer of the first triboelectric member 1312 and conductive layer 1320 to electrically isolate the two from each other. If material 1322 is a dielectric, it will achieve this function. One or both of the outer surfaces of the first triboelectric member 1312 and the second triboelectric member 1319 can have a nanoscale texture to facilitate increased charge transfer during contact. When up and down reciprocating motion is applied to this generator 1300 the surfaces of the triboelectric members 1312 and 1319 go in and out of contact, which will cause current to flow through a load (not shown) coupling the two conductive surfaces of the triboelectric members 1312 and 1319.

Another embodiment of a generator 1400 is shown in FIGS. 14A-14D. This embodiment includes a waterproof shell 1410 (which in the embodiment shown is spherical, but could be any one of many other three dimensional shapes) with a conductive inner surface 1414 (which could include, for example, copper) affixed to the inside surface of the shell 1410. A first triboelectric layer 1416 is affixed to the conductive inner surface 1414 and includes a first material that has a first rating on a triboelectric series (for example, a polytetrafluoroethylene film).

A conductive three dimensional object 1420 is disposed inside of the shell 1410 and includes a conductive core 1424 (which could include, for example, copper). (The conductive three dimensional object 1420 is shown as being spherical, but could be one of many other shapes.) A second triboelectric layer 1422 affixed to the conductive core 1422 and includes a second material (which could include, for example, a polyamide film) that has a second rating on the triboelectric series, in which the second rating is different from the first rating. A first conductor 1418 is electrically coupled to the conductive inner surface 1414 and extends to outside of the shell 1412.

A second conductor 1426 is electrically coupled to the conductive core 1424 and also extends to outside of the shell 1412. A member 1428 suspends the three dimensional object 1420 within the shell 1412 and allow the three dimensional object 1420 to move freely around the inside of the shell 1412 (including from a plurality of positions in which the second triboelectric layer is in contact with the first triboelectric layer to a plurality of positions in which the second triboelectric layer is not in contact with the first triboelectric layer). Member 1428 can include an insulating cladding to isolate conductor 1426 from conductive surface 1414. Again, one or both of the triboelectric material surfaces 1416 and 1422 can include nanoscale texture on an outer surface thereof to improve charge transfer.

A load 1430 can be coupled between the conductors 1418 and 1426 so that when the generator 1400 moves around and, thus, when object 1420 moves in and out of contact with first triboelectric layer 1416, current flows through the load 1430. This embodiment, because it may be made waterproof, may be useful in harvesting energy from wave action and the like.

In one experimental embodiment of a generator in an enclosed spherical shell, a Cu film (250 nm) electrode was evaporated on a PTFE film (thickness of 25 μm), which was attached to the inner surface of a large plastic ball (diameter of 80 mm). Another Cu film (250 nm) was evaporated on a PA film (thickness of 25 μm), which was attached to the outer surface of a smaller sphere (diameter of 50 mm). The smaller sphere was placed inside the large spherical shell, and both were linked by cables. The fabricated device was then sealed by epoxy paint so that it was fully waterproof. This fabricated generator embodiment is based on the contact-separation between the PTFE film on the inner surface of the larger spherical shell and the PA film on the outer surface of the smaller sphere to induce a voltage drop for driving electrons to flow in the external circuit. The smaller sphere can freely oscillate in any direction in responding to the disturbance from the environment.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A generator, comprising:
    (a) a substantially cylindrical first member, including:
        (i) a first electrode; and
        (ii) a first dielectric layer affixed to the first electrode, the first dielectric layer including a first material that has a first rating on a triboelectric series, the first dielectric layer including a first grating of evenly spaced apart parallel ridges and troughs disposed along a second direction that is transverse to a first direction;
    (b) a substantially cylindrical second member disposed inside of the first member, the second member including a second material that has a second rating on the triboelectric series that is different from the first rating, the second member including a second electrode, the second member disposed adjacent to the first dielectric layer so that the first dielectric layer is disposed between the first electrode and the second electrode, the second member including a second grating of evenly spaced apart parallel ridges and troughs disposed along the second direction; and (c) a sliding mechanism configured to cause relative motion between the first member against the second member, thereby generating an electric potential imbalance between the first electrode and the second electrode, wherein the ridges and troughs of the first grating and the second grating extend parallel to a cylindrical axis and wherein the sliding mechanism is configured to cause relative rotational motion between the first member and the second member about the cylindrical axis.

2. The generator of claim 1, wherein the ridges of the first grating have a nanoscale texture on an outer surface thereof.

3. A generator, comprising:
(a) a substantially cylindrical first member, including:
  (i) a first electrode; and
  (ii) a first dielectric layer affixed to the first electrode, the first dielectric layer including a first material that has a first rating on a triboelectric series, the first dielectric layer including a first grating of evenly spaced apart parallel ridges and troughs disposed along a second direction that is transverse to a first direction;
(b) a substantially cylindrical second member disposed inside of the first member, the second member including a second material that has a second rating on the triboelectric series that is different from the first rating, the second member including a second electrode, the second member disposed adjacent to the first dielectric layer so that the first dielectric layer is disposed between the first electrode and the second electrode, the second member including a second grating of evenly spaced apart parallel ridges and troughs disposed along the second direction; and
(c) a sliding mechanism configured to cause relative motion between the first member against the second member, thereby generating an electric potential imbalance between the first electrode and the second electrode,
  wherein the ridges and troughs of the first grating and the second grating are disposed circumferentially so as to be transverse to a cylindrical axis and wherein the sliding mechanism is configured to cause reciprocating motion between the first member and the second member along the cylindrical axis.

4. The generator of claim 3, wherein the ridges of the first grating have a nanoscale texture on an outer surface thereof.

5. A generator, comprising:
(a) a substantially cylindrical first member, including:
  (i) a first electrode; and
  (ii) a first dielectric layer affixed to the first electrode, the first dielectric layer including a first material that has a first rating on a triboelectric series, the first dielectric layer including a first grating of evenly spaced apart parallel ridges and troughs disposed along a second direction that is transverse to a first direction;
(b) a substantially cylindrical second member disposed inside of the first member, the second member including a second material that has a second rating on the triboelectric series that is different from the first rating, the second member including a second electrode, the second member disposed adjacent to the first dielectric layer so that the first dielectric layer is disposed between the first electrode and the second electrode, the second member including a second grating of evenly spaced apart parallel ridges and troughs disposed along the second direction; and
(c) a sliding mechanism configured to cause relative motion between the first member against the second member, thereby generating an electric potential imbalance between the first electrode and the second electrode,
  wherein the ridges and troughs of the first grating are helically disposed about an inside surface of the first member and wherein the ridges and troughs of the first grating and the second grating are helically disposed about an outside surface of the second member.

6. The generator of claim 5, wherein the ridges of the first grating have a nanoscale texture on an outer surface thereof.

* * * * *